United States Patent Office 2,727,002
Patented Dec. 13, 1955

2,727,002
NON-FOAMING DRILLING FLUID

David A. Rowe, Houston, Tex., assignor to Sun Oil Company, Philadelphia, Pa., a corporation of New Jersey No Drawing. Application December 31, 1952,
Serial No. 329,130

5 Claims. (Cl. 252—8.5)

This invention relates to drilling fluid compositions and their use in the drilling of oil or gas wells and more particularly is directed to the problem of inhibiting foaming of the fluid during the drilling operation.

Conventional drilling fluids comprise a colloidal clay, such as bentonite, dispersed in water in sufficient amount to impart desired viscosity and gel forming characteristics to the drilling fluid. Weighting agents, such as barytes, may be added in order that the weight of the mud composition will be sufficient to overcome the pressure in formations penetrated by the drill bit. The aqueous phase of the drilling fluid may contain little if any soluble salt or may have a salt content (mainly sodium chloride) ranging up to that of saturated salt water. In many instances emulsion type drilling fluids are employed by adding oil, such as crude oil or diesel oil, to the mixture and dispersing it therein by means of a suitable emulsifying agent, for example, mahogany sulfonates or sodium lignin sulfonate. In special cases such as in work-over jobs, emulsion compositions may be used which are merely oil-water emulsions without any added colloidal clay.

Under various conditions obtaining during the drilling of a well, foaming of the drilling fluid composition is apt to occur. This is usually due to air bubbles becoming trapped or dispersed in the drilling mud as it is circulated through the system, and it may also be due to gas-cutting of the mixture due to gas derived from gas-containing formations traversed by the borehole. The entrapment of air or gas in the drilling fluid with resultant foaming gives rise to operating difficulties, such as loss in weight of the mud and inability of the mud to release gas while flowing through the mud ditches and pits, which desirably should be avoided.

It has now been found that with drilling fluid compositions containing salt water, the problem of foaming can be effectively avoided or minimized by incorporating in the composition a minor amount of Turkey-red oil (sulfated castor oil). This material has been found to be an efficient defoaming agent when used in muds in which the salt content of the aqueous phase is above 150,000 p. p. m., and is particularly effective for saturated salt water muds. On the other hand, Turkey-red oil has little defoaming ability when the salt content of the aqueous phase is substantially below 150,000 p. p. m.

In one aspect the present invention thus is directed to an improved drilling fluid composition comprising salt water containing at least 150,000 p. p. m. of salt and containing Turkey-red oil in amount sufficient to inhibit foaming. The amount of Turkey-red oil that should be used will vary dependent upon the particular composition of the mud but generally will be within the range of 0.05 to 2.0 lbs./bbl. of drilling fluid. With non-emulsion type drilling fluids composed of clay dispersed in salt water, considerably larger amounts of Turkey-red oil may be used if desired, although amounts above 2.0 lbs./bbl. generally are not required for effective foam inhibition.

When the drilling fluid is an emulsion type composition, prepared by dispersing oil in a salt water-clay mixture, or merely in salt water itself, by means of a suitable emulsifying agent, an excessive amount of Turkey-red oil will cause the emulsion to break and accordingly should be avoided. It has been found with this type of drilling fluid, however, that an amount of Turkey-red oil can be used that will be effective to inhibit foaming and yet will not cause de-emulsification of the oil. Amounts in the range of 0.05 to 1.0 lb./bbl. generally will inhibit foaming without causing the undesirable de-emulsification. As a usual rule, the Turkey-red oil will begin to cause de-emulsification somewhere within the range of 1.0 to 2.0 lbs./bbl. so that such amounts should be avoided when the drilling fluids is of the emulsion type.

In another aspect the present invention involves a method of preventing foaming while drilling an oil or gas well with an emulsion or non-emulsion type drilling fluid in which the salt content of the aqueous phase is at least 150,000 p. p. m. This method involves adding to the drilling fluid during the drilling operation Turkey-red oil in amount effective to inhibit foaming as discussed above.

As a specific illustration of the invention, an emulsion composition was prepared as follows:

350 cc. saturated salt water
35 cc. diesel oil
15 g. low mol. weight sodium lignosulfonate
2 g. caustic soda This composition represents a special type of drilling fluid which has been used mainly in work-over jobs on existing wells. It has considerable tendency toward troublesome foam formation. It was found that by adding Turkey-red oil in amount of ¼ lb./bbl., foaming was substantially eliminated without causing any noticeable effect on stability of the oil-water emulsion. On the other hand, it was found that when various other additives were tried, including two commercial grades of sulfonated animal fats, seven commercial grades of petroleum sulfonates and capryl alcohol, none of these was effective in preventing foam formation even when used in amounts up to that which caused breaking of the oil-water emulsion.

Saturated salt water drilling fluids are receiving increased attention and are being used more widely in drilling for petroleum in recent years due to the fact that they offer several advantages as compared to muds which contain little or no salt. One advantage is that the mud properties remain more stable during drilling since salt contamination from brines and salt containing formations encountered during drilling can have little if any effect. Another advantage is that heaving of shale formations is avoided since the saturated salt water muds, unlike non-salt muds, will not hydrate the shales. Still another is that certain components of oil sands, such as illites, will swell in contact with water of low salt content thereby resulting in decreased oil production but are not subject to swelling when contacted with saturated salt water. The increased use of saturated salt water muds for these reasons lends importance to the present invention in providing an effective way of eliminating the foaming troubles often encountered when drilling muds of this type are used.

I claim:

1. A drilling fluid comprising salt water containing at least 150,000 p. p. m. of salt and having dispersed therein a material selected from the group consisting of colloidal clay and oil, and a minor amount of Turkey-red oil sufficient to inhibit foaming.

2. A drilling fluid comprising salt water containing at least 150,000 p. p. m. of salt, a colloidal clay dispersed therein, and a minor amount of Turkey-red oil sufficient to inhibit foaming.

3. A drilling fluid comprising salt water containing at least 150,000 p. p. m. of salt, a colloidal clay dispersed therein, and Turkey-red oil in foam-inhibiting amount of 0.05–2.0 lbs./bbl. of drilling fluid.

4. An emulsion type drilling fluid comprising salt water containing at least 150,000 p. p. m. of salt, a colloidal clay, oil dispersed in the salt water by means of an emulsifying agent, and Turkey-red oil in amount sufficient to inhibit foaming but insufficient to cause de-emulsification.

5. In the drilling of an oil or gas well involving circulation through the borehole during the drilling operation a drilling fluid comprising salt water containing at least 150,000 p. p. m. of salt and having dispersed therein a material selected from the group consisting of colloidal clay and oil, the method of inhibiting foaming of the drilling fluid which comprises adding thereto a minor amount of Turkey-red oil.

References Cited in the file of this patent

UNITED STATES PATENTS

| | | |
|---|---|---|
| 1,964,641 | Mathias | June 26, 1934 |
| 2,135,745 | Cone | Nov. 8, 1938 |
| 2,169,369 | Osterloh et al. | Aug. 15, 1939 |
| 2,209,591 | Barnes | July 30, 1940 |
| 2,355,255 | Zimmer et al. | Aug. 8, 1944 |
| 2,622,070 | Monson | Dec. 16, 1952 |